United States Patent [19]

Block

[11] 4,447,341

[45] May 8, 1984

[54] CLAY STABILIZER COMPOSITION FOR AQUEOUS DRILLING FLUIDS

[75] Inventor: Jacob Block, Rockville, Md.

[73] Assignee: W. R. Grace & Co., New York, N.Y.

[21] Appl. No.: 412,152

[22] Filed: Aug. 27, 1982

[51] Int. Cl.$^3$ .......................... C09K 7/00; C09K 3/00; E21B 3/00
[52] U.S. Cl. ............................ 252/8.5 A; 252/8.5 B; 252/8.5 C; 252/8.55 R
[58] Field of Search .............. 252/8.5 A, 8.5 B, 8.5 C, 252/8.55 R

[56] References Cited

U.S. PATENT DOCUMENTS

| | | | |
|---|---|---|---|
| 4,045,357 | 8/1977 | Reed | 252/8.5 B X |
| 4,240,915 | 12/1980 | Block | 252/8.5 B |
| 4,349,443 | 9/1982 | Block | 252/8.5 A |
| 4,353,804 | 10/1982 | Green et al. | 252/8.5 A |

FOREIGN PATENT DOCUMENTS

| | | | |
|---|---|---|---|
| 1465149 | 2/1977 | United Kingdom | 252/8.5 A |
| 2073228 | 10/1981 | United Kingdom | 252/8.5 A |
| 2110227 | 6/1983 | United Kingdom | 252/8.5 A |

OTHER PUBLICATIONS

George R. Gray, et al., Composition and Properties of Oil Well Drilling Fluids, 4th Ed., pp. 57-58 and 378-379.

Primary Examiner—Teddy S. Gron
Assistant Examiner—Catherine S. Kilby
Attorney, Agent, or Firm—Edward J. Cabic

[57] ABSTRACT

The combination of AlO(OH) and crosslinked polyvinyl alcohol can be added to aqueous drilling fluids and especially clay-based aqueous drilling fluids to prevent formation clays and shales from swelling and dispersing when contacted with aqueous drilling fluids. A potassium salt can be added to improve the result. The potassium salt can also be added by making AlO(OH) from potassium aluminate.

31 Claims, No Drawings

CLAY STABILIZER COMPOSITION FOR AQUEOUS DRILLING FLUIDS

BACKGROUND OF THE INVENTION

This invention relates to a composition which can be added to aqueous drilling fluids to prevent formation clays and shales from swelling and dispersing when contacted with the aqueous drilling fluids.

DESCRIPTION OF THE PREVIOUSLY PUBLISHED ART

Gray et al in "Composition and Properties of Oil Well Drilling Fluids" 4th edition (Gulf Publishing Co. 1980) discloses the use of potassium compounds in drilling muds to suppress the swelling of bentonite. Potassium chloride is the preferred compound.

U.S. Pat. No. 4,349,443 discloses using a combination of an AlO(OH) viscosifying agent and a polyvinyl alcohol which has been crosslinked with formaldehyde (PVA-F) as a water loss controller when formulating an essentially clay free aqueous drilling fluid. In other words, instead of using a conventional clay based drilling fluid, the patent teaches replacing clay with this combination of this AlO(OH) viscosifying agent and PVA-F water loss controller.

OBJECTS OF THE INVENTION

It is an object of this invention to provide an interacting combination of materials to be added to an aqueous drilling fluid to reduce or prevent clay expansion and dispersion.

It is a further object of this invention to use a combination of AlO(OH) and a crosslinked polyvinyl alcohol to provide a clay stabilizer composition.

It is a further object of this invention to use a further combination of AlO(OH), a crosslinked polyvinyl alcohol and a potassium salt to provide a clay stabilizer composition.

It is a further object of this invention to make the AlO(OH) from a potassium aluminate so as to have the by-product potassium salt present.

It is a further object of this invention to provide aqueous, clay-based drilling fluids containing a combination of AlO(OH) and a crosslinked polyvinyl alcohol to reduce or prevent clay expansion and dispersion in a clay containing formation when drilling a bore hole with bore hole drilling tools and utilizing a water-based drilling fluid.

These and further objects will become apparent as the description of the invention proceeds.

SUMMARY OF THE INVENTION

Clay materials can be stabilized against swelling and dispersing in underground formations such as in bore holes when drilling for oil and gas with bore hole drilling tools by adding to the drilling fluid a synergistic combination of AlO(OH) which can be either pseudo-boehmite, boehmite or in the amorphous form with a crosslinked polyvinyl alcohol (PVA). A further preferred embodiment is to also have present a third ingredient which is a potassium salt such as potassium chloride and in another preferred embodiment the aluminum hydroxide AlO(OH) can be made from a potassium salt so that there will be some residual potassium present in the resulting product.

DESCRIPTION OF THE PREFERRED EMBODIMENTS

Each of the component materials used in the synergistic combination of the present invention have been disclosed in patent publications for use in oil well drilling fluids. For example, AlO(OH) has been used as a viscosifier for aqueous drilling fluids which are substantially free of any clay. Similarly, the crosslinked polyvinyl alcohol has been used as a water loss controller for aqueous drilling fluids which are also substantially free of any clay as well as with clay based drilling fluids. Finally, potassium salts and especially potassium chloride have been used in drilling fluids to prevent clay swelling. However, as will be shown below, in a prepared embodiment where potassium chloride is used in further combination with the other two major ingredients of this invention, significantly improved results are obtained as compared to just using potassium chloride alone.

It has also been known to use a combination of AlO(OH) and a crosslinked polyvinyl alcohol as a combination viscosifier and water loss controller when formulating an aqueous drilling fluid which does not contain any substantial amount of clay. This concept is described in U.S. Pat. No. 4,349,443. However, in that patent disclosure this combination of materials is only disclosed as having utility as a combination viscosifier and water loss controller; there is no recognition that such a combination could be used for clay stabilization. Furthermore, that patent application is specifically directed to the case where there is no clay present in the aqueous drilling fluid. The patent disclosure provides no suggestion to use such a viscosifier and water loss controller composition in a clay based drilling fluid since the clay in the clay based drilling fluid already is providing its own viscosifing and water loss controlling effects.

It has been surprisingly found, according to the present invention, that by using a combination of AlO(OH) and a crosslinked polyvinyl alcohol in an aqueous drilling fluid there will be a reduction in the swelling of the formation shale and clay. With the addition of a potassium salt, and more preferably a potassium chloride salt, it has been further found that the clay stabilizing property of the composition is additionally enhanced. In another embodiment of the invention the potassium compound can be added as a by-product when forming the AlO(OH) by reacting potassium aluminate with either an acid or an aluminum containing acid salt so that the resulting product will be the AlO(OH) component along with the by-product potassium compound.

In order to demonstrate the ability of the present additive compositions to reduce clay swelling in aqueous systems, a test procedure has been devised as follows. Sodium bentonite, a common highly expanding clay sometimes found when drilling for oil or gas, is made into pellets having a volume of 1 cubic centimeter (1 cm$^3$) by placing the material in a pellet press. These pellets are then treated with various test aqueous compositions to determine the amount of expansion the clay pellet experiences upon being treated with the aqueous formulation. The pellet is then placed in a graduated cylinder after treatment and the amount of displacement of the water is measured. By subtracting the initial known volume from the final measured volume of the pellet the pellet volume increase that the pellet has undergone due to contact with the test composition is determined.

An additional test procedure for evaluating these clay stabilizing compositions is to initially thermally treat the liquid test composition at a temperature of about 121° C. for about 16 hours to subject the composition to the high temperatures which can occur when drilling for oil and gas. This test is especially relevant since the crosslinked polyvinyl alcohol employed is an organic material and it might be expected that it would degrade under these higher thermal conditions.

When the clay pellet is placed in water alone, it completely disperses. This evidences the problem that occurs in clay-containing oil well formations when the aqueous drilling fluid contacts the clay in the formation. By using the combination of AlO(OH) and crosslinked polyvinyl alcohol according to the present invention, the 1 cm$^3$ clay pellets remain intact and only swells to a relatively small volume which is on the order of 2-4 cm$^3$.

When the AlO(OH) component is made from a potassium salt so that there is a by-product potassium compound present, then the pellet expansion is only on the order of about 1.5 cm$^3$. Similar advantageous results are obtained when the AlO(OH) component is made from a sodium salt and then a potassium salt such as potassium chloride is added to the composition. In this case, the pellet volume increase is on a low order of about 1.5 cm$^3$.

In formulating the aqueous compositions, it has been found that the ratio of the crosslinked PVA to the amount of the AlO(OH) is such that the crosslinked PVA can be present in an amount of from about 20% to 180% by weight of the AlO(OH). A more preferable range is from about 60% to about 100% by weight of the AlO(OH).

The amount of the additive composition which is mixed with water can be from about 1-5% by weight of the water with very satisfactory results being obtained when the AlO(OH) and the crosslinked PVA comprise together about 3.2% of the weight of the water.

The amount of potassium salt which can be added can be a relatively small amount such as in the range of about 20 to about 200% by weight of the weight of the AlO(OH) with a preferred value of about 50% by weight of the weight of the AlO(OH).

In conducting the thermal stability test, it has been surprisingly found that rather than a degradation in clay stabilizing properties due to the heat treatment of the aqueous compositions, the clay stabilizing properties in some instances have improved especially when potassium chloride is present. As a result the clay pellets may have even smaller volume increases when subjected to these thermally treated aqueous compositions.

As discussed above, the AlO(OH) component can be made from an alkaline metal aluminate by the reaction of this aluminate with either an acid or an aluminum containing acid salt. For example, it can be made by reacting sodium aluminate with hydrochloric acid. In view of the superior results obtained by having a potassium salt present in the additive composition, it has been found advantageous to prepare the AlO(OH) from a potassium aluminate treated with either an acid or an aluminum containing acid salt. The resulting AlO(OH) product also has present the by-product potassium salt which enhances the clay stabilizing properties of the resulting composition when this component is added to the crosslinked PVA. Among the aluminum containing acid salts which could be reacted with the potassium aluminate are aluminum chloride, aluminum sulfate or mixtures of these two ingredients.

These compositions containing the AlO(OH) with the potassium salt by-product obtained by reacting potassium aluminate with the acid or the aluminum containing acid salt also withstand the thermal stability test so that these compositions maintain their clay stabilizing properties.

When the AlO(OH) component is made from the potassium aluminate source, the by-product potassium salt is also obtained as the precipitated AlO(OH) is recovered. Even after filtering and drying the precipitated AlO(OH) there still remains a sufficient amount of the by-product potassium salt to provide its additional advantageous clay stabilizing effect.

The compositions made from the dried AlO(OH) powder with the residual potassium salt also maintain their clay stabilizing properties when given the thermal treatment.

The crosslinked polyvinyl alcohol is formed by contacting polyvinyl alcohol and an aldehyde containing or generating compound. The polyvinyl alcohols found useful have a weight average molecular weight of at least about 20,000 and preferably the weight average molecular weight should be from about 90,000 to 200,000. Conventionally, polyvinyl alcohol is the hydrolyzed product of polyvinyl acetate. The hydrolysis should be at least about 75% complete and preferably at least about 80 to 95% complete to form a suitable polyvinyl alcohol reactant. A preferred polyvinyl alcohol has a weight average molecular weight of about 120,000 and it is a hydrolysis product of polyvinyl acetate with the hydrolysis being about at least 87% complete. The polyvinyl alcohol reactant, such as formed from the hydrolysis of polyvinyl acetate or the like, can be reacted in an aqueous medium with an aldehyde containing or generating reactant. Suitable aldehyde containing reactants are organic chemical compounds which contain at least one aldehyde group therein as are well known and include, for example, formaldehyde, acetaldehyde, propionaldehyde, glycolaldehyde, glyoxalic acid and the like or polyaldehydes, i.e., organic compounds having more than one aldehyde group in the compound, such as glyoxal, glutaraldehyde, paraformaldehyde and the like. Other suitable aldehyde reactants include aldehyde generating agents, i.e., known organic compounds capable of forming an aldehyde group in situ, such as melamine-formaldehyde monomeric products and derivatives such as tri and hexa(methylol) melamine and the tri and hexa($C_1$-$C_3$ alkoxymethyl) melamine. Such materials can be formed by known conventional methods. The alkyl blocked derivatives are commercially available, are stable to self-polymerization and are, therefore, preferred. Of all of the aldehyde reactants, the preferred reactants are paraformaldehyde, formaldehyde, and glutaraldehyde.

The subject polyvinyl alcohol reaction product found suitable in the subject composition to impart the desired properties can be formed by reacting a polyvinyl alcohol, as described above, with from at least about 0.05 and preferably from about 0.1 to 200 and most preferably from about 2 to 50% of stoichiometry of an aldehyde reactant based on the hydroxyl content of the polyvinyl alcohol. Stoichiometry is defined as the reaction of 2 OH groups with one aldehyde group. Excess aldehyde can be used. The particular amount of aldehyde agent will depend on its solubility in the aqueous reaction media, and its reactivity as is known and determinable by conventional means. The amount used will depend on the type of aldehyde. Glutaraldehyde, for example, will require a much lesser amount than paraformaldehyde.

The reaction is carried out in an aqueous medium which should be acidic, that is, have a pH of about 5.5 or less and preferably from about 1.5 to 4.5 with an especially preferred range of from about 1.5 to 2.5. The reaction can be carried out at ambient or elevated temperatures, such as from about 50° C. to 100° C. The solid product can be recovered by conventional techniques such as by salting out with a sulfate, carbonate or phosphate salt, decantation, filtration and drying or by running the reaction in a non solvent such as a sodium sulfate solution and recovering the product.

The clay stabilizing additives according to the present invention can be used in clay based fluids so as to improve the clay stabilizing properties of those fluids. Among the clay based fluids which can be treated with the present additives are fluids containing sodium bentonite, attapulgite, sepiolite or mixtures of these clay containing materials.

Having described the basic aspects of the invention, the following examples are given to illustrate specific embodiments thereof.

EXAMPLES 1-4

These examples are comparison examples to show that each of the component materials when used alone does not provide effective clay stabilization.

In each of these experiments sodium bentonite pellets were prepared from powdered sodium bentonite in a pellet press and each pellet had a volume of 1 cubic centimeter (1 cm$^3$). The pellets were suspended in a metal holder and placed in a beaker containing the clay stabilizing aqueous composition to be tested. The compositions were made by adding the various additive ingredients to water in the amounts listed in Table 1. The AlO(OH) was a stabilized pseudoboehmite which was stabilized by the addition of a mixture of tartaric acid and gluconic acid according to the process described in U.S. patent application Ser. No. 370,979 filed Apr. 22, 1982. More specifically, the acid mixture contained 1.4% by weight tartaric acid and 0.3% by weight gluconic acid on an AlO(OH) basis. The crosslinked PVA was prepared by crosslinking polyvinyl alcohol with formaldehyde by the addition of 1.2 ml of a 37% formaldehyde solution per 50 g. of polyvinyl alcohol by the process set forth in U.S. patent application Ser. No. 176,803 filed Aug. 11, 1980. The potassium chloride, KCl, was reagent grade made by J. T. Baker. The compositions were stirred with a magnetic stirrer and allowed to remain overnight. The increase in the pellet volume was determined by placing the pellets in a known volume of water in a graduated cylinder and measuring the amount of water displaced. By subtracting the original 1 cm$^3$ pellet volume from the increase in displaced water volume, the amount of pellet volume increase is determined. The results are set forth in Table 1.

TABLE 1

| Example No. | Additive (%) | Pellet Volume Increase (cm$^3$) |
|---|---|---|
| 1 | none - water only | dispersed |

TABLE 1-continued

| Example No. | Additive (%) | Pellet Volume Increase (cm$^3$) |
|---|---|---|
| 2 | AlO(OH) (2.0) | (a) |
| 3 | KCl (1.0) | dispersed |
| 4 | Crosslinked PVA (1.2) | 9.0 |

(a) too soft to measure, pellet broken up

When water alone is used or with 1% potassium chloride the pellet completely disperses. In Example 2 the pellet also dispersed, but to a lesser degree so that a small part of the pellet remained intact. In Example 4 using the crosslinked PVA the pellet volume increased nine times its original volume so that the resulting total volume was 10 cm$^3$.

EXAMPLES 5-6

These examples illustrate preferred compositions according to the present invention.

In Example 5 the additive composition was a combination of AlO(OH) at a 2.0% level and crosslinked PVA at a 1.2% level. In Example 6 this same composition was used which further contained potassium chloride at a 1.0% level based on the weight of water. The same pellet expansion test as described in Examples 1-4 was employed and the results are set forth in Table 2.

TABLE 2

| Example No. | Additive (%) | Pellet Volume Increase (cm$^3$) |
|---|---|---|
| 5 | AlO(OH) (2.0) Crosslinked PVA (1.2) | 4.0 |
| 6 | AlO(OH) (2.0) Crosslinked PVA (1.2) KCl (1.0) | 2.5 |

These results show the significant reduction in the pellet volume increase test value which is obtained by using the preferred compositions according to the present invention. Also there was no occurence of any clay dispersion.

EXAMPLES 7-8

These examples illustrate the thermal stability of the preferred compositions.

The aqueous solutions containing the additives according to the present invention were heated in a roller oven for 16 hours at 121° C. The two compositions were then tested for clay stabilization using the pellet test described in Examples 1-4 above. The results are set forth in Table 3.

TABLE 3

| Example No. | Additive (%) | Pellet Volume Increase (cm$^3$) |
|---|---|---|
| 7 | AlO(OH) (2.0) Crosslinked PVA (1.2) | 4.0 |
| 8 | AlO(OH) (2.0) Crosslinked PVA (1.2) KCl (1.0) | 1.5 |

These results show that the AlO(OH)-crosslinked PVA combination is still effective and maintains its shale stabilizing properties even after having been heated at 121° C. for 16 hours. The results also show that the performance was even more effective with the addition of 1% KCl.

EXAMPLES 9–10

These examples compare the results obtained when the AlO(OH) is obtained from a sodium base and from a potassium base.

In Example 9 the AlO(OH) is prepared from $NaAlO_2$ and HCl while in Example 10 the AlO(OH) is prepared from $KAlO_2$ and HCl. The precipitated AlO(OH) was then used to prepare the additive having the composition 2.0% AlO(OH) and 1.2% PVA-F. The same pellet expansion test procedure described in Examples 1–4 was followed with the results given in Table 4.

TABLE 4

| Example No. | Base Used in Preparation | Pellet Volume Increase (cm³) |
|---|---|---|
| 9 | $NaAlO_2$ | 4.0 |
| 10 | $KAlO_2$ | 1.5 |

There is a significant reduction in pellet volume increase when using the potassium system.

EXAMPLES 11–12

These examples compare the thermal stability of the aqueous clay stabilizing compositions when the AlO(OH) is prepared from a sodium base and from a potassium base.

These examples correspond to Examples 9 and 10 except that the sample solutions were first heated in a roller oven at 250° F. for 16 hours. The results are set forth in Table 5.

TABLE 5

| Example No. | Base Used in Preparation | Pellet Volume Increase (cm³) |
|---|---|---|
| 11 | $NaAlO_2$ | 3.0 |
| 12 | $KAlO_2$ | 1.5 |

The thermal treatment was not harmful. The results are satisfactory and again the potassium system provides better results.

EXAMPLES 13–14

These examples compare the acceptable results obtained when the AlO(OH), which is prepared from a sodium base and from a potassium base, is filtered and dried.

In Example 13 the AlO(OH) is prepared from $NaAlO_2$ and HCl while in Example 14 the AlO(OH) is prepared from $KAlO_2$ and HCl. In both cases the AlO(OH) was filtered and dried to a powder. The dried powder was then used to prepare the aqueous composition having 2.0% AlO(OH) and 1.2% PVA-F. The same pellet expansion test procedure described in Examples 1–4 was followed with the results given in Table 6.

TABLE 6

| Example No. | Base Used in Preparation | Pellet Volume Increase (cm³) |
|---|---|---|
| 13 | $NaAlO_2$ | 3.5 |
| 14 | $KAlO_2$ | 1.0 |

These results are also satisfactory. Again there is a significant reduction in pellet volume increase when using the potassium system.

EXAMPLES 15–16

These examples compare the thermal stability of the aqueous clay stabilizing compositions when the AlO(OH) was added in the dried powder form after being prepared from a sodium base and from a potassium base.

These examples correspond to Examples 13 and 14 except that the sample solutions were first heated in a roller oven at 250° F. for 16 hours. The results are set forth in Table 7.

TABLE 7

| Example No. | Base Used in Preparation | Pellet Volume Increase (cm³) |
|---|---|---|
| 15 | $NaAlO_2$ | 2.8 |
| 16 | $KAlO_2$ | 2.0 |

The results are clearly very satisfactory and again the potassium system provides better results.

EXAMPLES 17–19

These examples illustrate the utility of the present additives in a clay based system. A stock mud was prepared and contained 1.42% hydrated sodium bentonite, 0.57% ferrochrome lignosulfonate and 0.14% Glen Rose shale. The pellet tests described above were run in the following three examples set forth in Table 8.

TABLE 8

| Example No. | Additives (%) | Base Used in Preparation | Pellet Volume Increase (cm³) |
|---|---|---|---|
| 17 | none | — | disintegrated |
| 18 | AlO(OH) (2.0) Crosslinked PVA (1.2) | $NaAlO_2$ | 4.0 |
| 19 | AlO(OH) (2.) Crosslinked PVA (1.2) | $KAlO_2$ | 2.0 |

In the control Example 17 with no additive the pellet disintegrated. The results in Examples 18 and 19 demonstrate that the AlO(OH) and crosslinked polyvinyl alcohol additive works well in a clay based system.

It is understood that the foregoing detailed description is given merely by way of illustration and that many variations may be made therein without departing from the spirit of this invention.

What is claimed is:

1. A clay stabilizing composition comprising
water,
clay, and
a clay stabilizing additive mixture in an amount of 1–5% by weight of the water comprising
an aluminum hydroxide having the formula AlO(OH), and a crosslinked polyvinyl alcohol which is crosslinked with at least about 0.05 to 200 percent of stoichiometry with a compound containing at least one aldehyde group therein or capable of generating in an aqueous medium at least one aldehyde group.

2. The clay stabilizing composition of claim 1, wherein the crosslinked polyvinyl alcohol is present in an amount which is from about 20% to 180% by weight of the AlO(OH).

3. The clay stabilizing composition of claim 2, wherein the crosslinked polyvinyl alcohol is present in an amount which is from about 60% to 100% by weight of the AlO(OH).

4. The clay stabilizing composition of claim 1 further comprising a potassium salt.

5. The clay stabilizing composition of claim 4, wherein the potassium salt is selected from the group consisting of KCl, $K_2SO_4$, $K_2CO_3$, $KHCO_3$, and mixtures thereof.

6. The clay stabilizing composition of claim 5, wherein the potassium salt is KCl.

7. The clay stabilizing composition of claim 1, wherein the AlO(OH) is prepared by reacting potassium aluminate with an acid or an aluminum containing acid salt.

8. The clay stabilizing composition of claim 7, wherein the acid is HCl.

9. The clay stabilizing composition of claim 7, wherein the aluminum containing acid salt is selected from the group consisting of aluminum chloride, aluminum sulfate, and mixtures thereof.

10. The clay stabilizing composition of claim 9, wherein the aluminum containing acid salt is aluminum chloride.

11. The clay stabilizing composition of claim 1, wherein the crosslinked polyvinyl alcohol is formed in an aqueous acidic medium having a pH of about 5.5 or lower by reacting polyvinyl alcohol having a weight average molecular weight of at least 20,000 with at least about 0.05 to 200 percent of stoichiometry of a compound containing at least one aldehyde group therein or capable of generating in an aqueous medium at least one aldehyde group.

12. The clay stabilizing composition of claim 11, wherein the compound containing at least one aldehyde group is selected from the group consisting of formaldehyde, paraformaldehyde, glutaraldehyde and mixtures thereof.

13. The clay stabilizing composition of claim 11, wherein the crosslinked polyvinyl alcohol has a weight average molecular weight of about 120,000 and is a hydrolysis product of polyvinyl acetate with the hydrolysis being about at least 87% complete.

14. The clay stabilizing composition of claim 11, wherein the pH of the acidic medium is in the range of about 1.5 to 2.5.

15. A clay stabilizing composition according to claim 1, wherein the clay is selected from the group consisting of sodium bentonite, attapulgite, sepiolite, and mixtures thereof.

16. A clay stabilizing composition according to claim 1, wherein the AlO(OH) is prepared by reacting potassium aluminate with an acid.

17. A method of reducing the swelling of clays and shales in formations when drilling a bore hole with bore hole drilling tools and utilizing an aqueous clay-based drilling fluid circulating in the bore hole comprising adding to the aqueous drilling fluid an additive composition comprising
an aluminum hydroxide having the formula AlO(OH), and
a crosslinked polyvinyl alcohol which is crosslinked with at least about 0.05 to 200 percent of stoichiometry with a compound containing at least one aldehyde group therein or capable of generating in an aqueous medium at least one aldehyde group.

18. A method according to claim 17, wherein the clay is selected from the group consisting of sodium bentonite, attapulgite, sepiolite, and mixtures thereof.

19. A method according to claim 17, wherein the clay stabilizing composition is as defined in claim 2.

20. A method according to claim 17, wherein the clay stabilizing composition is as defined in claim 3.

21. A method according to claim 17, wherein the clay stabilizing composition is as defined in claim 4.

22. A method according to claim 17, wherein the clay stabilizing composition is as defined in claim 5.

23. A method according to claim 17, wherein the clay stabilizing composition is as defined in claim 6.

24. A method according to claim 17, wherein the clay stabilizing composition is as defined in claim 7.

25. A method according to claim 17, wherein the clay stabilizing composition is as defined in claim 8.

26. A method according to claim 17, wherein the clay stabilizing composition is as defined in claim 9.

27. A method according to claim 17, wherein the clay stabilizing composition is as defined in claim 10.

28. A method according to claim 17, wherein the clay stabilizing composition is as defined in claim 11.

29. A method according to claim 17, wherein the clay stabilizing composition is as defined in claim 12.

30. A method according to claim 17, wherein the clay stabilizing composition is as defined in claim 13.

31. A method according to claim 17, wherein the clay stabilizing composition is as defined in claim 14.

* * * * *